(12) United States Patent
Choi

(10) Patent No.: US 10,969,045 B2
(45) Date of Patent: Apr. 6, 2021

(54) SHOWERHEAD ADAPTER

(71) Applicant: Yuk Nam Choi, Bucheon-si (KR)

(72) Inventor: Yuk Nam Choi, Bucheon-si (KR)

( * ) Notice: Subject to any disclaimer, the term of this patent is extended or adjusted under 35 U.S.C. 154(b) by 368 days.

(21) Appl. No.: 15/747,110

(22) PCT Filed: Jul. 21, 2016

(86) PCT No.: PCT/KR2016/007935
§ 371 (c)(1),
(2) Date: Jan. 23, 2018

(87) PCT Pub. No.: WO2017/018715
PCT Pub. Date: Feb. 2, 2017

(65) Prior Publication Data
US 2018/0216764 A1    Aug. 2, 2018

(30) Foreign Application Priority Data

Jul. 24, 2015  (KR) .................. 10-2015-0105147

(51) Int. Cl.
*F16L 33/24*  (2006.01)
*F16L 21/02*  (2006.01)
*F16L 21/035*  (2006.01)
*A47K 3/28*  (2006.01)

(52) U.S. Cl.
CPC ............ *F16L 33/24* (2013.01); *F16L 21/022* (2013.01); *F16L 21/035* (2013.01); *A47K 3/28* (2013.01)

(58) Field of Classification Search
CPC ......... F16L 33/24; F16L 33/10; F16L 21/035; F16L 27/08; F16L 37/08; B05B 1/18
See application file for complete search history.

(56) References Cited

FOREIGN PATENT DOCUMENTS

| JP | 10238678 A | * 9/1998 | ............. F16L 27/08 |
|---|---|---|---|
| JP | 2006-336764 A | 12/2006 | |
| JP | 4388291 B2 | 12/2009 | |
| KR | 20-0288757 Y1 | 9/2002 | |
| KR | 20-0461753 Y1 | 8/2012 | |
| KR | 10-1331060 B1 | 11/2013 | |

OTHER PUBLICATIONS

KR Notification of Reason for Refusal dated Jan. 13, 2017 as received in Application No. 10-2015-0105147 (Machine Translation).
KR Grant of Patent dated Jul. 25, 2017 as received in Application No. 10-2015-0105147 (Machine Translation).

* cited by examiner

*Primary Examiner* — Erin Deery
(74) *Attorney, Agent, or Firm* — Maschoff Brennan

(57) ABSTRACT

A shower head adapter includes a body part, which has one side connected to the inner circumferential surface of the inlet side of a main shower head body and the other side connected to a hose. The shower head adapter also includes a first circular groove formed along the outer circumferential surface thereof and a main body connecting part, which has an end on the other side protruding inwards from the inner circumferential surface thereof. A part of the inner circumferential surface is coupled to the outer circumferential surface of the inlet side of the main shower head body. A snap ring is inserted in the first circular groove. The diameter of the outer circumferential surface of the snap ring is larger than the diameter of the protruding inner circumferential surface of the main body connecting part.

8 Claims, 4 Drawing Sheets

SHOWERHEAD ADAPTER

TECHNICAL FIELD

The present invention relates to a shower head adapter, and more specifically, to a shower head adapter connecting between a main shower head body and a hose.

BACKGROUND ART

Descriptions disclosed in this Background section is only for enhancement of understanding of the background of the invention and they may therefore contain information that does not include the prior art that is already known to a person of ordinary skill in the art.

A shower head consists of a main shower head body and a hose connecting to the main shower head body. The hose connects to a bathtub in the bathroom and when water is provided, the water is carried to the main shower head body through a flow channel inside the shower head.

The main shower head body has a flow channel and a plurality of outlets linked with the flow channel formed therein, such that water may be sprayed through the plurality of outlets. The user may shower on any part of the body by gripping the shower head.

However, the hose is twisted or moves freely when flow speed of water increases during a shower. This may result in a reduction in lifespan of the hose in case the hose is continuously exposed to such a situation.

Disclosure

Technical Problem

The present invention is devised to solve the problems of the related art above stated and is directed to providing a shower head adapter capable of preventing a hose from being twisted or moving freely even when flow speed of water increases during the time in which a shower head is used.

Technical Solution

A shower head adapter according to one embodiment of the present invention comprises: a body part having a flow channel penetrating one side and the other side thereof, wherein the one side connects to the inner circumferential surface of the inlet side of a main shower head body and the other side connects to a hose, and having a first circular groove formed along the outer circumferential surface thereof; a main body connecting part sharing the flow channel with the body part, and having an end portion on the other side protruding inwardly from the inner circumferential surface thereof, wherein a part of the inner circumferential surface is coupled to the outer circumferential surface of the inlet side of the main shower head body; and a snap ring inserted into a first circular groove, and having a diameter of the outer circumferential surface thereof larger than the diameter of the protruding inner circumferential surface of the main body connecting part so as to prevent the main body connecting part from escaping from the body part when force acts in the direction from the other side to the one side of the body part.

Technical Solution

Here, the shower head adapter further comprises at least one O-ring, the one side of the body part is inserted into the inner circumferential surface of the inlet side of the main shower head body, at least one second circular groove is formed along the outer circumferential surface of the inserted body part, and the O-ring is inserted into the second circular groove.

Furthermore, the outer circumferential surface of the body part has a first protruding part and a second protruding part formed thereon, and the first circular groove is formed between the first protruding part and the second protruding part, wherein the first protruding part is formed in the direction of the one side of the body part from the reference point of the first circular groove, and the second protruding part is formed in the direction of the other side of the body part from the reference point of the first circular groove.

Furthermore, the height of the first protruding part is smaller than that of the second protruding part, the inner side of the snap ring has a part cut in the direction of the one side of the body part, such that the cut part is caught in the first protruding part when force acts in the direction of the one side of the body part.

Furthermore, the one side of the body part has a rectangular, square groove formed in the direction of diameter thereof.

Furthermore, the outer circumferential surface of the other side of the body part has a screw thread formed thereon such that the screw thread is screwed into a screw thread formed on the inner circumferential surface of the hose.

Furthermore, the inner circumferential surface of the main body connecting part has a screw thread formed thereon such that the screw thread is screwed into a screw thread formed on the outer circumferential surface of the inlet side of the main shower head body.

Furthermore, an end portion of the other side of the main body connecting part protrudes perpendicularly to the length direction of the main body connecting part.

Advantageous Effects

A hose is prevented from being twisted or moving freely, even when flow speed of water increases during the time in which a shower head is used, because a main shower head body according to the present invention rotates in the direction in which force acts.

PREFERRED EMBODIMENTS OF THE PRESENT INVENTION

The present invention may be understood more readily by reference to the following description of embodiments together with the accompanying drawings. However, the present invention may be embodied in many different forms and should not be construed as being limited to the embodiments set forth hereafter. Rather, these embodiments are provided so that the present invention will be through and complete and will fully convey the concept of the invention to those skilled in the art, and the present invention will only be defined by the appended claims.

Figure 1:
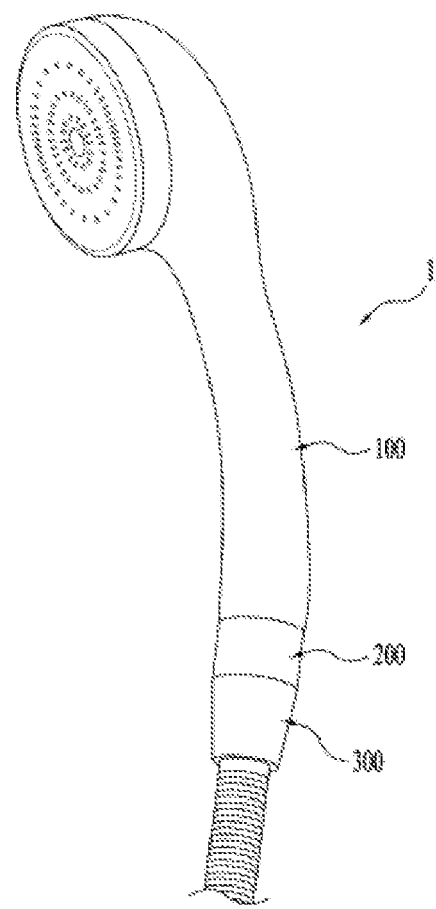
FIG. 1 is a perspective view illustrating a state where a shower head adapter according to one embodiment of the present invention connects between a main shower head body and a hose.
Figure 2:
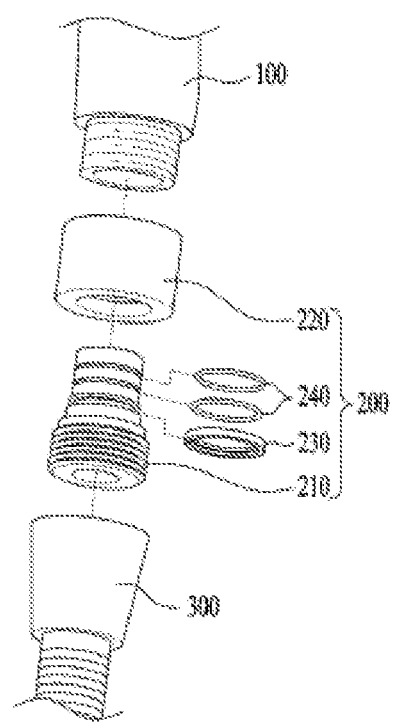
FIG. 2 is an exploded perspective view illustrating a state where a shower head adapter according to one embodiment of the present invention is separated from a main shower head body and a hose.

FIG. 1 is a perspective view illustrating a state where a shower head adapter according to one embodiment of the present invention connects between a main shower head body and a hose, and FIG. 2 is an exploded perspective view illustrating a state where a shower head adapter according to one embodiment of the present invention is separated from a main shower head body and a hose. By reference to FIGS. 1 and 2, a shower head 1 comprises a main shower head body 100, a shower head adapter 200 and a hose. The shower head adapter 200 may comprise a body part 210, a main body connecting part 220, a snap ring 230 and an O-ring 240.

A body part 210 has a flow channel formed to penetrate one side and the other side thereof. That is, the body part 210 has a hollow shape because the body part 210 has the flow channel formed therein. The body part 210 has one side thereof connecting to the inner circumferential surface of the inlet side of a main shower head body 100, and has the other side thereof connecting to a hose. The body part 210 has a first circular groove formed along the outer circumferential surface thereof. In detail, the body part 210 has the one side thereof inserted into the inner circumferential surface of the inlet side of the main shower head body 100, and has at least one second circular groove formed along the outer circumferential of the inserted body part. The material of the body part 210 may be ABS (Acrylonitrile, Butadiene and Styrene), synthetic resins, copper and stainless steel.

A main body connecting part 220 shares the flow channel with the body part. That is, the main body connecting part 220 has a hollow shape because the main body connecting part 220 has the flow channel. The main body connecting part 220 has an end portion of the other side thereof protruding inwardly from the inner circumferential surface thereof, wherein a part of the inner circumferential surface is coupled to the outer circumferential surface of the inlet side of the main shower head body 100. The material of the main body connecting part 220 may be synthetic resins such as ABS (Acrylonitrile, Butadiene and Styrene). The outer circumferential surface of the main body connecting part 220 may have the same color as the outer circumferential surface of the hose 300 so as to look as if the hose 300 directly connects to the main shower head body 100. A shower head 1 only for hot water may have an outer circumferential surface of a main body connecting part 220, which is red, so as to warn the user to be careful. Furthermore, a shower head 1 only for cold water may also have an outer circumferential surface of a main body connecting part 220, which is blue, to inform the user that the shower head is for cold water.

A snap ring 230 is inserted into the first circular groove. The snap ring 230 has a diameter of the outer circumferential surface thereof larger than the diameter of the protruding inner circumferential surface of the main body connecting part. With the above stated structure of the snap ring 230, the main body connecting part 220 is prevented from escaping from the body part 210 when force acts in the direction from the other side of the body part 210 to one side of the body part 210. The shape of the snap ring 230 will be described in detail by reference to the following FIG. 5. The material of the snap ring 230 may be synthetic resins such as ABS (Acrylonitrile, Butadiene and Styrene).

An O-ring 240 is inserted into the second circular groove and may be at least one. The O-ring 240 is inserted into the second circular groove so as to prevent water from leaking from the main shower head body 100 to the outer circumferential surface of the body part 210 of a shower head adapter 200. The material of the O-ring 230 may be rubber such as NBR (Nitrile-Butadiene Rubber), EPDM (Ethylene Propylene Diene Monomer), PTFE (Polytetrafluoroethylene) and Viton.

Figure 3:
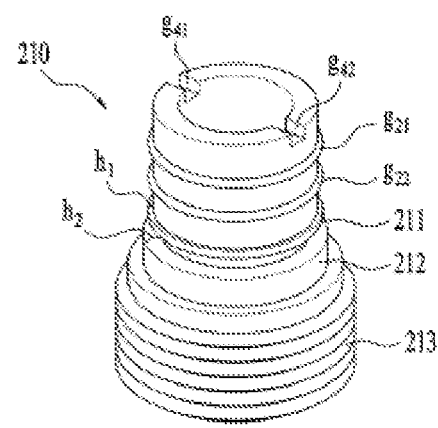
FIG. 3 is a perspective view illustrating a body part according to one embodiment of the present invention.
Figure 4:
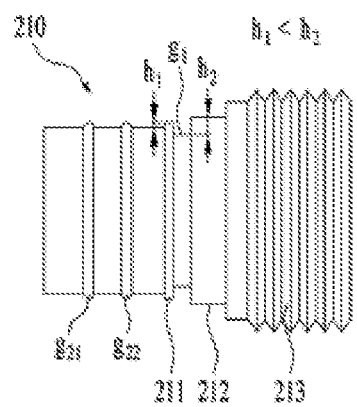
FIG. 4 is a side view illustrating a body part according to one embodiment of the present invention.

FIG. 3 is a perspective view illustrating a body part according to one embodiment of the present invention and FIG. 4 is a side view illustrating a body part according to one embodiment of the present invention. By reference to FIGS. 1 to 4, the body part 210 has a rectangular groove $g_{41}$, $g_{42}$, a second circular groove $g_{21}$, $g_{22}$, a first protruding part 211, a first circular groove $g_1$, a second protruding part 212 and a hose connecting part 213 formed on the outer circumferential surface in the direction from one side to the other side thereof.

A driver or a coin may be inserted into the rectangular groove $g_{41}$, $g_{42}$. In the state where a driver or a coin is inserted into the rectangular groove $g_{41}$, $g_{42}$, the driver or the coin may rotate clockwise or counterclockwise. When the driver or the coin rotates clockwise, the rectangular groove $g_{41}$, $g_{42}$ rotates clockwise such that a screw thread formed on the outer circumferential surface of the other side of the body part 210 is screwed into a screw thread formed on the inner circumferential surface of the hose 300. Conversely, when the driver or the coin rotates counterclockwise, the rectangular groove $g_{41}$, $g_{42}$ rotates counterclockwise such that the screw thread formed on the outer circumferential surface of the other side of the body part 210 is unscrewed from the screw thread formed on the inner circumferential surface of the hose 300.

The O-ring is inserted into the second circular groove $g_{21}$, $g_{22}$. FIGS. 3 and 4 illustrate two second circular grooves $g_{21}$, $g_{22}$ are formed, but the number of the second circular groove $g_{21}$, $g_{22}$ is not limited to two. So, various numbers of the second circular groove $g_{21}$, $g_{22}$ may be formed depending on the number of the O-ring 240.

The snap ring 230 is inserted into the first circular groove $g_{11}$, $g_{12}$ and has a first protruding part 211 and a second protruding part 212 on both sides thereof. That is, the first circular groove $g_{11}$, $g_{12}$ is formed between the first protruding part 211 and the second protruding part 212. The first protruding part 211 is formed in the direction of the one side of the body part 210 from the reference point of the first circular groove $g_1$, and the second protruding part 212 is formed in the direction of the other side of the body part 210 from the reference point of the first circular groove. The height $h_1$ of the first protruding part 211 is smaller than the height $h_2$ of the second protruding part 212.

The outer circumferential of a hose connecting part 213 has a screw thread formed thereon, and the height of the screw thread is bigger than the height $h_2$ of the second protruding part. The screw thread formed on the outer circumferential surface of the hose connecting part 213 is screwed into a screw thread formed on the inner circumferential of the hose 300.

There are times when a hose 300 is twisted, or a hose 300 moves freely when flow speed of water increases during in which a shower head is used. This may result in a reduction in lifespan of the hose in case the hose is continuously exposed to such a situation. Thanks to the screw thread formed on the outer circumferential surface of the hose connecting part 213 and on the inner circumferential surface of the hose 300, the main shower head body 100 rotates in the direction in which force acts, even when flow speed of water, flowing through the shower head 1, increases, such that the hose 300 may be prevented from being twisted or moving freely.

Figure 5:
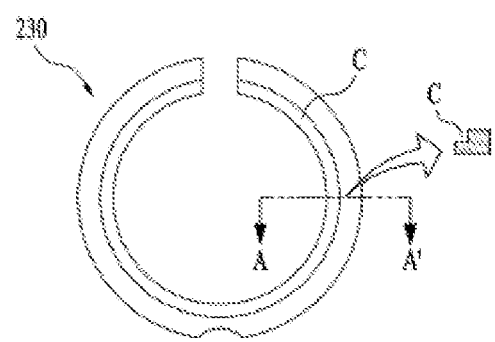
FIG. 5 is a perspective view illustrating a snap ring according to one embodiment of the present invention.

FIG. 5 is a perspective view illustrating a snap ring according to one embodiment of the present invention. By reference to FIGS. 1, 2 and 5, the snap ring 230 has a ring shape and has a part cut. The cut part of the snap ring 230 is flexible such that the snap ring is inserted around the body part 210 from one side to the other side of the body part 210, and then, inserted into the first circular groove of the body part 210.

The inner side of the snap ring 230 has a part C cut in the direction of one side of the body part 210. As illustrated in FIG. 5, a cross section of the snap ring 230 cut in the direction of A-A' has a "¬" shape. Because the cut part C is caught in the first protruding part when force acts in the direction of the one side of the body part 210, the main body connecting part 220 is prevented from escaping from the body part 210. Naturally, the shape of the part C cut to prevent the escape of the main body connecting part 220 is not limited to the "¬" one and the cut part C may have various shapes.

The snap ring 230 is inserted into the other side of the body part 210 from one side of the body part 210 (the opposite side of the hose connecting part 213) by means of an inserting tool, in the state where the main body connecting part 220 is inserted around the body part 210.

Figure 6:
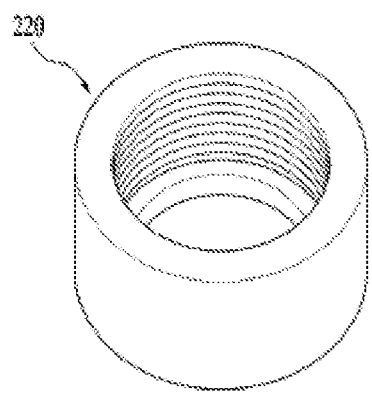
FIG. 6 is the first perspective view illustrating a main body connecting part according to one embodiment of the present invention.
Figure 7:
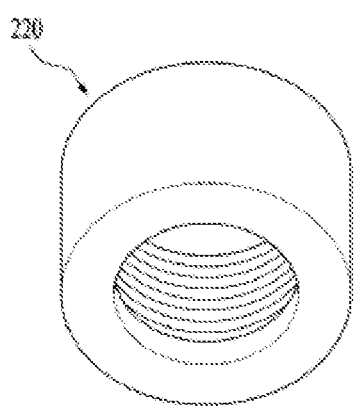
FIG. 7 is the second perspective view illustrating a main body connecting part according to one embodiment of the present invention.

FIG. 6 is the first perspective view illustrating a main body connecting part according to one embodiment of the present invention, and FIG. 7 is the second perspective view illustrating a main body connecting part according to one embodiment of the present invention. By reference to FIGS. 1, 2, 6 and 7, the main body connecting part 220 has a cylindrical shape and is inserted around the body part 210 into the other side of the body part 210 from one side of the body part 210. A golf hat with an adjustable visor having the above-mentioned features according to the present invention operates as follows.

A main body connecting part 220 has an end portion of the other side thereof protruding inwardly perpendicularly to the length direction of the main body connecting part 220, wherein the main body connecting part has a screw thread formed on the inner circumferential surface thereof such that the screw thread is screwed into a screw thread formed on the outer circumferential surface of the inlet side of the main shower head body 100. That is, the inner circumferential surface of the main body connecting part 220 has a screw thread formed to an end portion of the other side protruding inwardly thereof, from one side to the other side thereof.

While the present invention mentioned above have been described by reference to the accompanying drawings, it is to be understood that the invention is not limited to the described embodiments, but, on the contrary, is intended to cover various modifications and equivalent arrangements included within the spirit and scope of the appended claims. Accordingly, the scope of the present invention shall be understood only according to the appended claims.

The invention claimed is:

1. A shower head adapter comprising:
a body part having a flow channel penetrating a first side and a second side of the body part, wherein the first side of the body part connects to an inner circumferential surface of an inlet side of a main shower head body and the second side of the body part connects to a hose, and having a first circular groove formed along an outer circumferential surface of the body part;
a main body connecting part sharing the flow channel with the body part, and having an end portion of the main body connecting part protruding inwardly from an inner circumferential surface of the main body connecting part, wherein a part of the inner circumferential surface of the main body connecting part is coupled to an outer circumferential surface of the inlet side of the main shower head body; and
a snap ring inserted into the first circular groove and having an outer circumferential surface of the snap ring formed to have a diameter that is larger than a diameter of a protruding inner circumferential surface of the main body connecting part to prevent the main body connecting part from escaping from the body part when force acts from the second side to the first side of the body part.

2. The shower head adapter according to claim 1, further comprising at least one O-ring, wherein:
the first side of the body part is inserted into the inner circumferential surface of the inlet side of the main shower head body,
at least one second circular groove is formed along the outer circumferential surface of the inserted body part, and
the O-ring is inserted into the second circular groove.

3. The shower head adapter according to claim 2, wherein:
the outer circumferential surface of the body part has a first protruding part and a second protruding part formed thereon,
the first circular groove is formed between the first protruding part and the second protruding part,
the first protruding part being formed in a direction of the first side of the body part from a reference point of the first circular groove, and the second protruding part being formed, in the direction of the second side of the body part from the reference point of the first circular groove.

4. The shower head adapter according to claim 3, wherein:
the first protruding part is smaller than the second protruding part in height, and
an inner part of the snap ring has a part cut in the direction of the first side of the body part such that the part cut is caught in the first protruding part when force acts in the direction of the first side of the body part.

5. The shower head adapter according to claim 1, wherein:
the body part has a rectangular groove on the first side in a radial direction of the body part.

6. The shower head adapter according to claim 1, wherein:
the body part has a screw thread, formed on an outer circumferential surface of the second side of the body part, screwed into a screw thread formed on an inner circumferential surface of the hose.

7. The shower head adapter according to claim 1, wherein:
the main body connecting part has a screw thread, formed an inner circumferential surface of the main body connecting part, screwed into a screw thread formed on the an outer circumferential surface of the inlet side of the main shower head body.

8. The shower head adapter according to claim 1, wherein:
the main body connecting part has the end portion of the main body connecting part protruding perpendicularly relative to an axial direction of the main body connecting part.

* * * * *